(12) United States Patent
Horn et al.

(10) Patent No.: US 12,091,996 B2
(45) Date of Patent: Sep. 17, 2024

(54) LUBRICANT CHANGE SYSTEM FOR POWER TRANSMISSION EQUIPMENT

(71) Applicants: James Dawson Horn, Louisville, KY (US); William Koppelman, Oconomowoc, WI (US)

(72) Inventors: James Dawson Horn, Louisville, KY (US); William Koppelman, Oconomowoc, WI (US)

(\*) Notice: Subject to any disclaimer, the term of this patent is extended or adjusted under 35 U.S.C. 154(b) by 687 days.

(21) Appl. No.: 16/445,575

(22) Filed: Jun. 19, 2019

(65) Prior Publication Data
US 2020/0088075 A1  Mar. 19, 2020

Related U.S. Application Data

(60) Provisional application No. 62/804,002, filed on Feb. 11, 2019, provisional application No. 62/686,810, filed on Jun. 19, 2018.

(51) Int. Cl.
*F01M 11/02* (2006.01)
*B67D 7/84* (2010.01)
(Continued)

(52) U.S. Cl.
CPC .............. *F01M 11/02* (2013.01); *B67D 7/845* (2013.01); *F01M 1/02* (2013.01); *F01M 1/10* (2013.01);
(Continued)

(58) Field of Classification Search
CPC ........ B67D 7/845; F01M 11/02; F01M 11/04; F01M 1/02; F01M 1/10; F01M 2001/0284; F01M 2011/021; F01M 2011/035; F01M 2011/068; F16N 2210/02; F16N 2210/08; F16N 31/00; F16N 31/006; F16N 39/06
See application file for complete search history.

(56) References Cited

U.S. PATENT DOCUMENTS

| 2,479,139 A | 8/1949 | Seigel |
| 2,685,347 A | 8/1954 | Busby |

(Continued)

*Primary Examiner* — Grant Moubry
*Assistant Examiner* — Ruben Picon-Feliciano
(74) *Attorney, Agent, or Firm* — Carrithers Law Office, PLLC; David W. Carrithers

(57) ABSTRACT

A mobile vehicle lubrication unit for serving power transmission equipment elevated above ground level such as conveyors whereby the lubricant containing gear reducer unit is disposed in an enclosed body mounted on an upper portion of an elevated conveyor. The system includes a manifold system connectable to trailer mounted storage tanks for lubricants, pumps, filters, air supplies and supply lines, and transfer means mounted on a truck or trailer including side access to the control panel and transfer hoses enabling the user to transfer lubricants to elevated equipment such as conveyors by pulling along side of same. The device changes, filters, and replaces the oil in a reducer gearbox or other lubricant containing equipment which is not easily accessed from the ground level. Air presssure is used to evaculate used oil from the conveyor gear motor and/or reducer units and replaces the used oil with filtered or new oil through oil lines and hoses with quick disconnects which may be positioned on a manifold at ground level having oil lines in fluid communication with the gear motor/reducer unit.

15 Claims, 8 Drawing Sheets

(51) Int. Cl.
*F01M 1/02* (2006.01)
*F01M 1/10* (2006.01)
*F01M 11/03* (2006.01)
*F01M 11/04* (2006.01)
*F01M 11/06* (2006.01)
*F16N 31/00* (2006.01)

(52) U.S. Cl.
CPC ............ *F01M 11/04* (2013.01); *F16N 31/00* (2013.01); *F16N 31/006* (2013.01); *F01M 2001/0284* (2013.01); *F01M 2011/021* (2013.01); *F01M 2011/035* (2013.01); *F01M 2011/068* (2013.01); *F16N 2210/02* (2013.01); *F16N 2210/08* (2013.01)

(56) References Cited

U.S. PATENT DOCUMENTS

| | | | |
|---|---|---|---|
| 3,810,487 A * | 5/1974 | Cable | B60P 3/14 296/24.32 |
| 3,954,611 A * | 5/1976 | Reedy | F16N 39/00 210/182 |
| 4,059,123 A | 11/1977 | Bartos et al. | |
| 4,067,342 A | 1/1978 | Burton | |
| 4,141,366 A | 2/1979 | Cross et al. | |
| 4,153,553 A | 5/1979 | Davis | |
| 4,679,564 A | 7/1987 | Sessions | |
| 4,848,353 A | 7/1989 | Engel | |
| 4,867,166 A | 9/1989 | Axelgaard et al. | |
| 5,160,443 A | 11/1992 | Mesheau | |
| 5,417,851 A | 5/1995 | Yee | |
| 5,476,154 A | 12/1995 | Sage | |
| 7,245,957 B2 | 7/2007 | Rowe et al. | |
| 7,305,998 B2 | 12/2007 | Watt | |
| 8,955,897 B1 | 2/2015 | Miller et al. | |
| 8,992,773 B2 | 3/2015 | Marheine | |
| 9,131,895 B2 | 9/2015 | Grob et al. | |
| 9,605,506 B1 * | 3/2017 | Jameson | F16N 19/006 |
| 9,630,004 B2 | 4/2017 | Rajguru et al. | |
| 9,764,133 B2 | 9/2017 | Thomas et al. | |
| 2006/0207681 A1 | 9/2006 | Purington | |
| 2016/0369741 A1 * | 12/2016 | Carlson | F02F 7/0085 |

* cited by examiner

LUBRICANT CHANGE SYSTEM FOR POWER TRANSMISSION EQUIPMENT

CROSS REFERENCES TO RELATED APPLICATIONS

This application claims priority from U.S. Provisional application Ser. No. 62/686,810 filed on Jun. 19, 2018 and U.S. Provisional Application Ser. No. 62/804,002 filed on Feb. 11, 2019, both of which are incorporated by reference herein.

TECHNICAL FIELD

The present invention relates to the field of apparatus used to check, replace, and/or filter lubricating oil in a gearbox, reducer, or other mechanical device having an oil reservoir positioned in a remote location.

BACKGROUND OF THE INVENTION

Industries involving rock quarries, mining, and the like use elevated conveyors, crushing or grinding equipment, pumps or any elevated equipment using gear reducers or gearboxes driven by electric motors. These gearboxes and drive motors are typically located overhead at the top end of the conveyor. Routine maintenance is inconvenient and access is limited due to the height of the unit or construction and operational environment of the equipment. Ladders or personnel lifts might be used but such work is still relatively unsafe, inconvenient, expensive, and often requires downtime for the unit and support equipment. An operator or maintenance worker must somehow get lifted into position, remove guarding and set it aside, remove the drain plug and catch and contain the old oil, reinstall the drain plug, the remove the oil add plug, pour in the right amount of oil, reinstall the oil add plug, reinstall the guarding, take the used oil in container back down to the ground. Any one of these tasks may require unnecessary risk when accomplished from a ladder or even a lift.

Power transmission equipment is used in many industries. Such equipment is powered by an electric motor coupled with a shaft mounted speed reducer otherwise known as a gearbox. Most power transmission machines use a closed contained lubrication system that requires the oil to be changed periodically, based on operating hours. The standard method of making this oil change involves the user accessing the system which in many situations is located at extreme heights above plant or facility elevations, and many times, over stockpiles of products and or additional obstacles that are in a fixed remote position. This poses a problem for the operator and it is often difficult to position lifting equipment for changing the oil, manpulating hoses, and/or removal and storage of contaminated fluid due to the size of conveying systems and close proximity of support equipment.

Shaft mounted speed reducers are typically equipped with the following standard items: a fill plug that is removed to manually fill the gearbox with a predetermined amount of new oil; a drain plug located in the bottom of the gearbox that, when removed, allows the used oil to drain naturally into a waste container for proper disposal or recycling; and a vent or breather which allows the oil to expand or contract as the temperatures in and outside the gearbox change. When changing the lubricating oil, the above items must be considered. Additionally, the new oil and waste oil must be elevated and lowered from the area where the gearbox is located. Guarding around the gearbox and motor must be removed, temporarily set aside and then replaced whenever the oil is changed. These pose potential safety issues to the operator when draining and filling the gearbox.

The present invention provides a system for checking, filtering and/or replacing spent lubricating oil without having to physically access the gearbox or reducer at the top of the conveyor or other equipment at elevated heights.

For instance the Dodge Parts replacement manual for Dodge Torque-Arm Speed reducers Models TXT(older style) and Dodge TA II (newer style) it reads as follows. "Under average industrial operating conditions the lubricant should be changed every 2500 operating hours or every 6 months or whichever occurs first, drain the reducer and flush with kerosene and refill with oil. The instant invention provides a system from ground level to preform this task of draining, flushing, and refilling the gear reducer with fresh oil from ground level in a safe and efficient as well as performing this task per the manufacture's recommended procedure.

SUMMARY OF THE INVENTION

The lubricant change system for power transmission equipment can be utilized as a quick change and/or lubrication oil replacement system for all types of equipment having oil reservoirs; however, the instant invention is optimized for maintaining difficult to access equipment requiring routine maintenance.

A mobile vehicle lubrication unit for serving power transmission equipment elevated above ground level such as conveyors whereby the lubricant containing gear reducer unit is disposed in an enclosed body mounted on an upper portion of an elevated conveyor. The system includes a manifold system connectable to trailer mounted storage tanks for lubricants, pumps, filters, air supplies and supply lines, and transfer means mounted on a truck or trailer including side access to the control panel and transfer hoses enabling the user to transfer lubricants to elevated equipment such as conveyors by pulling along side of same. The device changes, filters, and replaces the oil in a reducer gearbox or other lubricant containing equipment which is not easily accessed from the ground level. Air pressure is used to evacuate used oil from the conveyor gear motor and/or reducer units and replaces the used oil with filtered or new oil through oil lines and hoses with quick disconnects which may be positioned on a manifold at ground level having oil lines in fluid communication with the gear motor/reducer unit.

A preferred embodiment for use with conveyors includes a drain side open air lock to release the spent oil into permanent plubed lines from the gearbox to the ground. A line filer to protect the wase oil from damaging the drain pump and a valve to sample th waste oil prior flowing through the filter is useful in orer to analyze the waste oil for metals and dirt which is indicative of the condition of the gearbox.

More particularly, the present invention provides an oil changing system for gearboxes located in overhead positions. The system includes permanently plumbed piping from the drain, fill and vent apertures in the gearbox housing. The three pipes lead from the gearbox to a manifold located at a more convenient location where a worker can temporarily park his service trailer. The three pipes terminate on the manifold with quick disconnect couplings.

The present invention provides a unit capable of servicing field equipment which enables the service vehicle crew to park in close proximity to the equipment to be maintained and eliminate frequent movement during the servicing operation. The unit's accessiblity results in a larger number of units being serviced in a shorter time interval and permits servicing of equipment in limited space. The present invention provides a mobile vehicle lubrication unit mounted onto a truck, van, or trailer, whereby it can be located within close proximity to vehicles to be lubricated and have the lubricating oil changed and/or filtered and the service supplies, transfer hoses, and control units for same are located within easy reach from a side access area of the mobile lubrication system vehicle.

The service trailer includes a fresh oil container and pump with a hose and hose reel with a quick disconnect coupling, a waste oil container and pump with a hose and hose reel with a quick disconnect coupling, and an air hose and hose reel with a quick disconnect coupling. The fresh oil hose includes a meter for measuring and ensuring that the correct amount of fresh oil has been delivered to the gearbox. The waste oil hose includes a filter to catch any debris or metal pieces which may have been in the gearbox. A compressed air source and hose is also supplied on the trailer as well as a 110 VAC generator to supply the pumps and any other electrical needs.

It is an object of this invention to provide a safe system for changing oil in difficult to access equipment such as overhead gearboxes used on conveying equipment installed at higher elevations than can be reached safely on the ground.

It is an object of this invention to provide a safe system for changing oil in overhead gearboxes which includes permanent piping form the gearbox to a manifold wherein the new oil pipe, waste oil pipe and vent air pipes terminate at the manifold with quick disconnect couplings and also includes an oil change trailer with a plurality of hose reels, typically including at least three hose reels for supplying fresh oil, retrieving used oil, and venting air to the gearbox, all through hoses connected to the quick disconnects on the manifold. The trailer also contains fresh oil, a used oil receptacle, and pumps and filters for new and used oil transfer.

It is an object of this invention to provide a safe system for changing oil in overhead gearboxes including a oil change trailer which includes a waste oil sampling valve and filters to protect a used oil transfer pump and a new oil transfer pump with an output meter for transferring a selected amount of new oil to the gearbox.

It is an object of the present invention to increase safety and minimize climbing to the top of the conveyor to change the gear box oil.

It is an object of the present invention to change the oil at ground level.

It is an object of the present invention to provide both fill and drain lines running to a manifold mounted to the conveyor base.

It is an object of the present invention to provide all gear boxes with plumbing and a manifold.

It is an object of the present invention to a system for changing gear box lubricant which can also fill the grease system of the conveyor.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
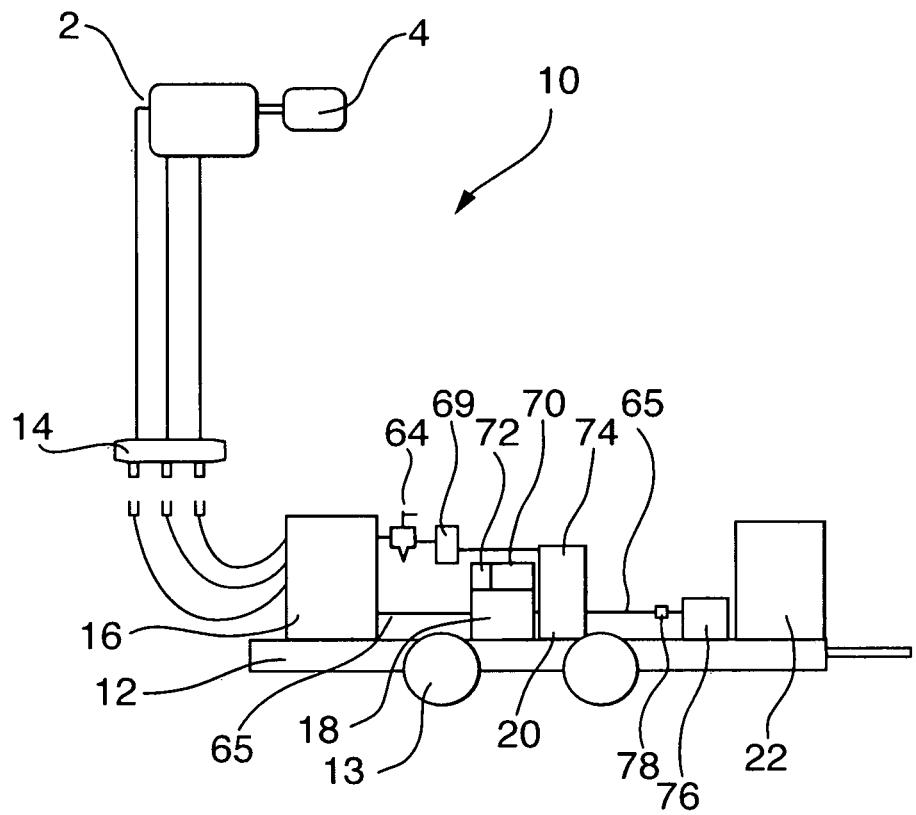
FIG. 1 shows a front view of an gearbox, piping, and a oil change trailer.
Figure 2:
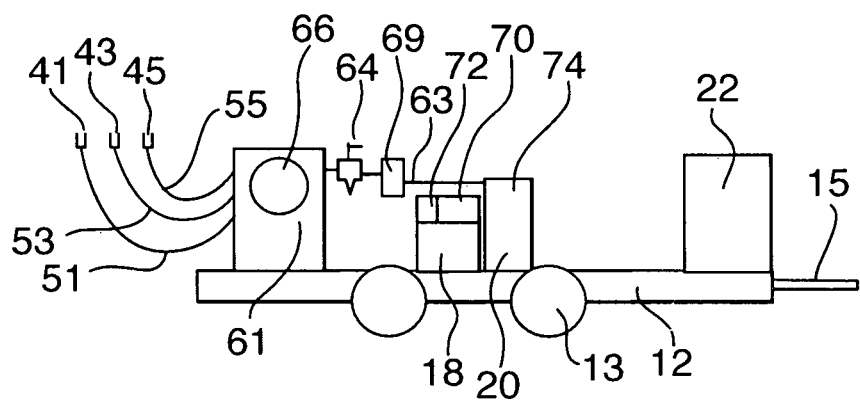
FIG. 2 shows another front view of the oil change trailer of the present invention.
Figure 3:
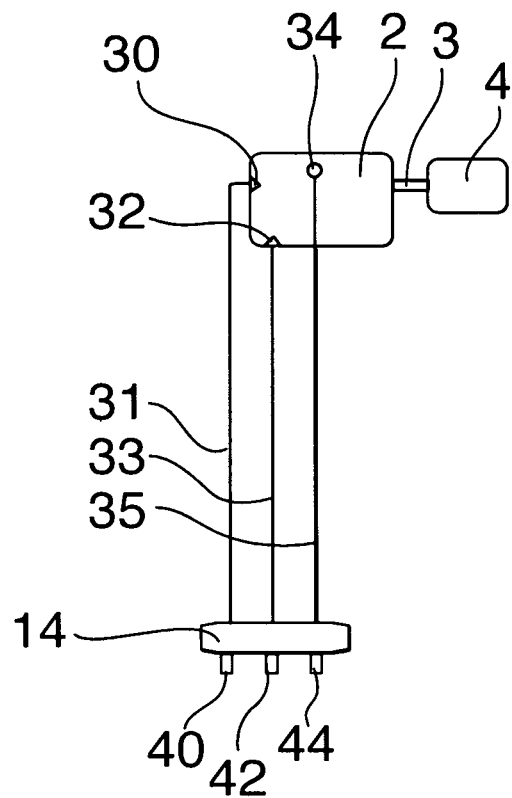
FIG. 3 shows another front view of the gearbox and associated piping.
Figure 4:
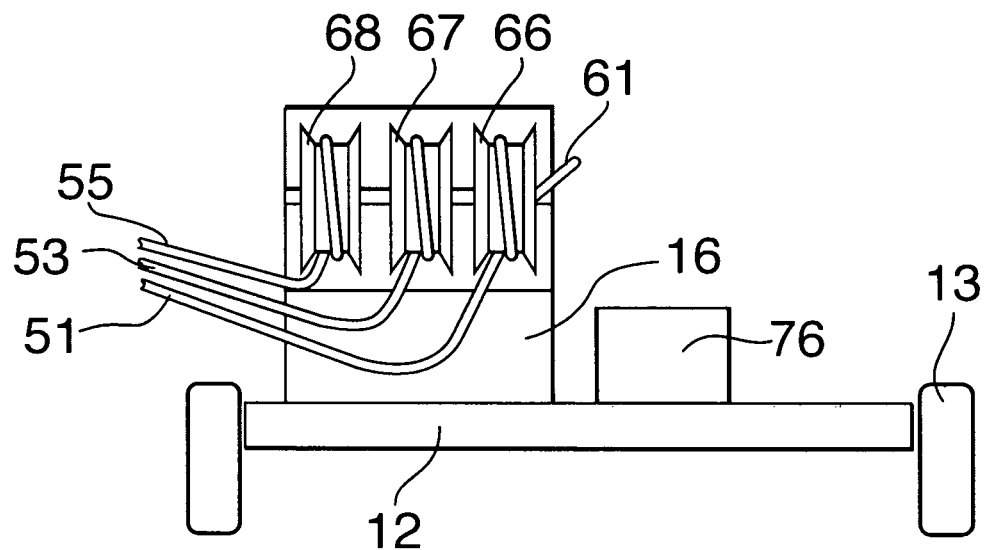
FIG. 4 show a rear view of the trailer and hose reel cabinet.
Figure 5:
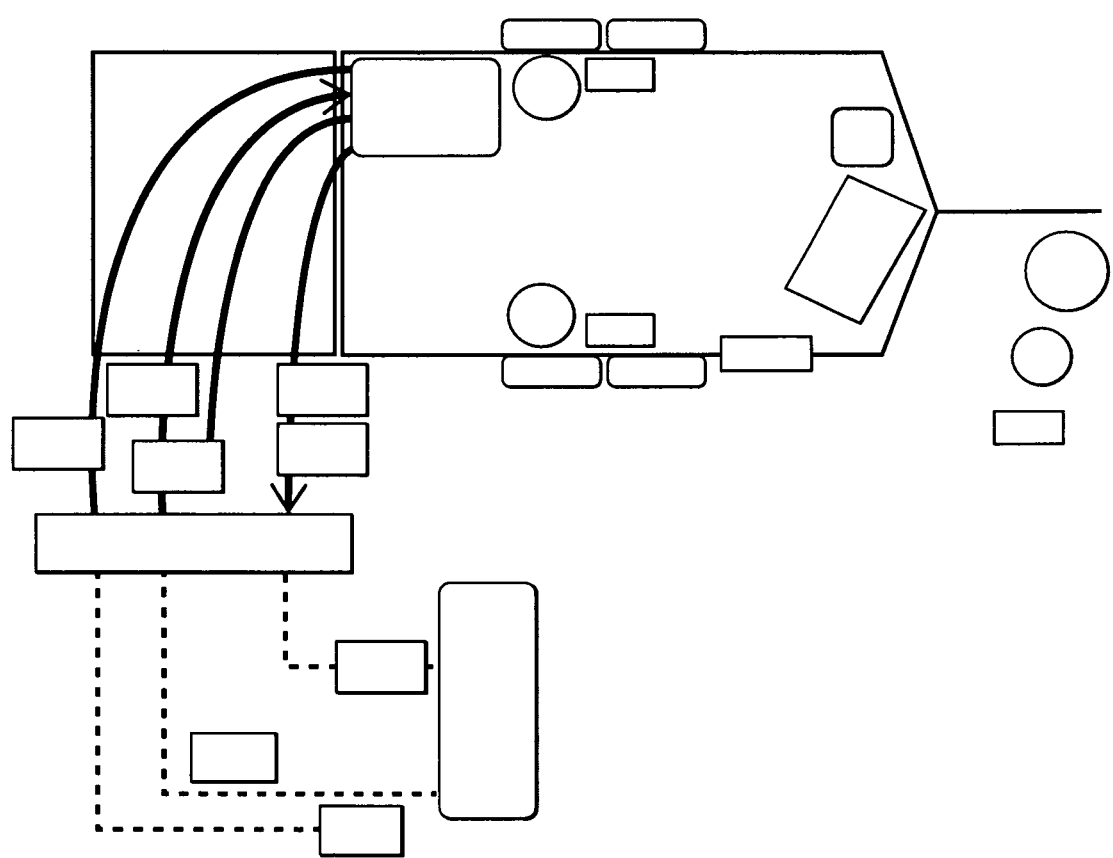
FIG. 5 is a top view of a trailer and transfer assembly.
Figure 6:
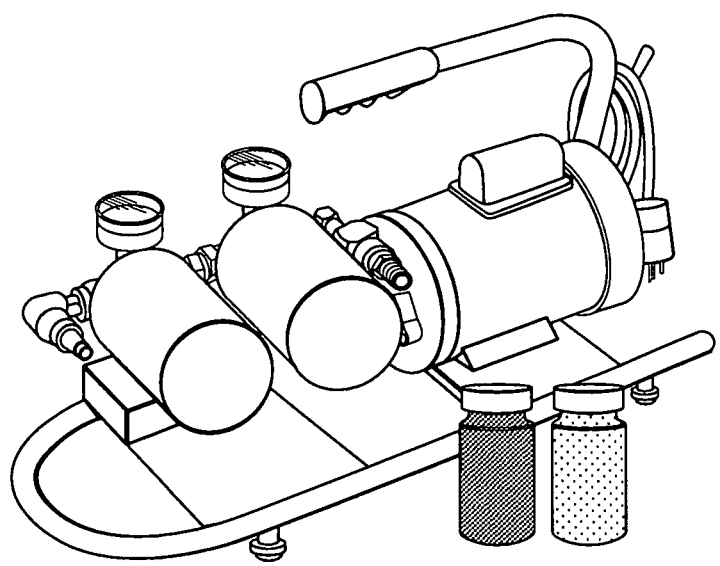
FIG. 6 is a perspective view of a pump and filtering assembly.
Figure 7:
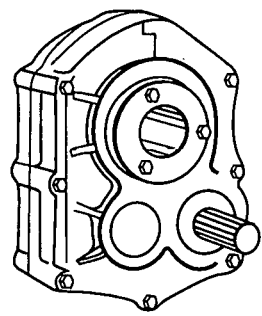
FIG. 7 shows a reducer.
Figure 8:
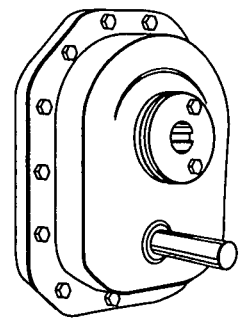
FIG. 8 shows an alternate embodiment of a reducer.
Figure 9:
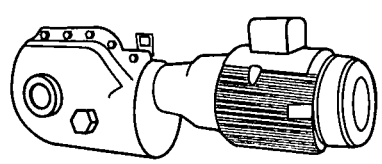
FIG. 9 shows an alternate embodiment of a reducer.
Figure 10:
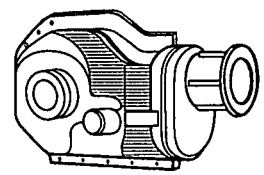
FIG. 10 shows an alternate embodiment of a reducer.
Figure 11:
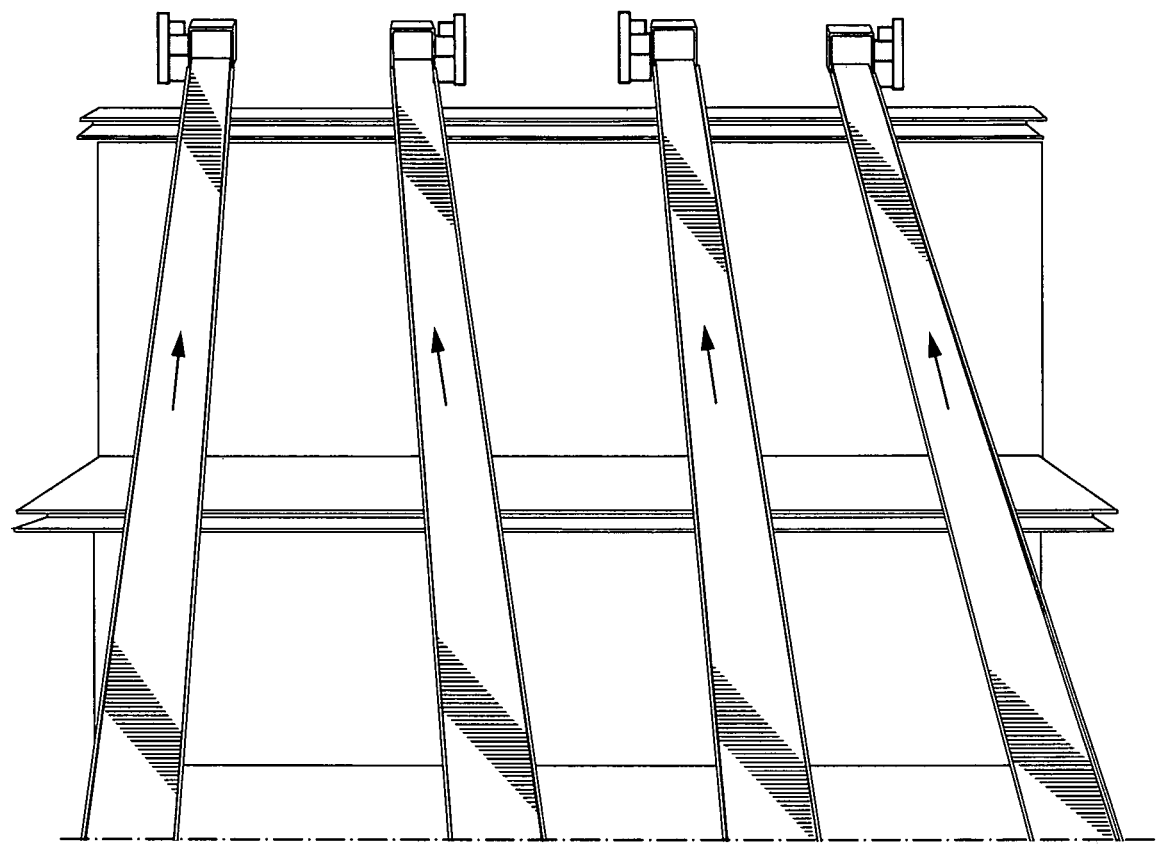
FIG. 11 shows a group of conveyors all of which have the motor and gear reducer assembly mounted at the top distal end of the conveyor.
Figure 12:
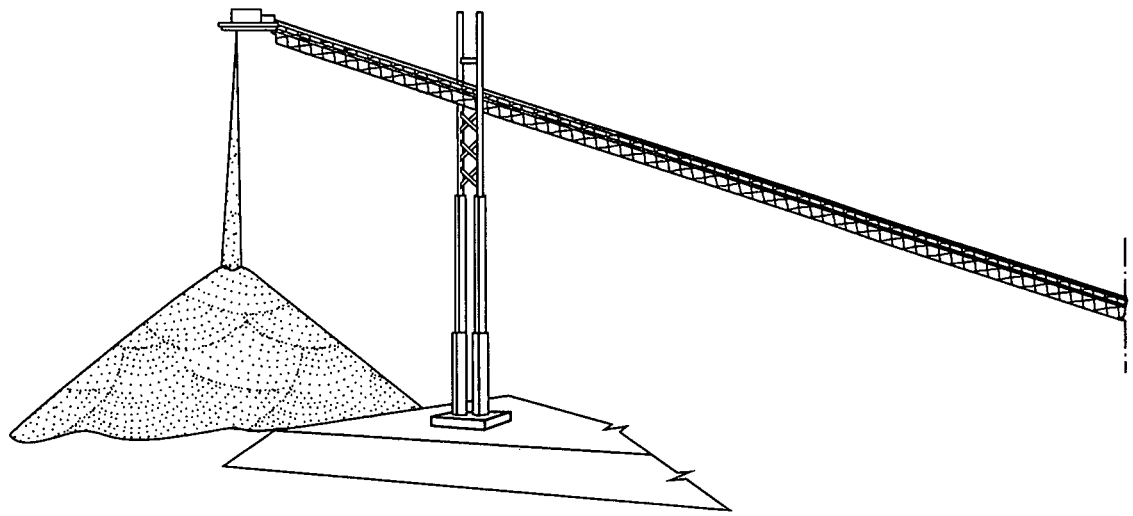
FIG. 12 is a perpsective view of a group of conveyors having the motor and gear reducer mounted at the top of the elevated distal end of the conveyor.
Figure 13:
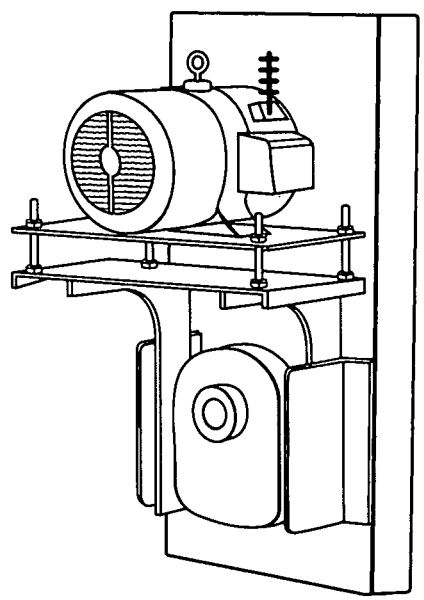
FIG. 13 shows a motor and gear reducer assembly.
Figure 14:
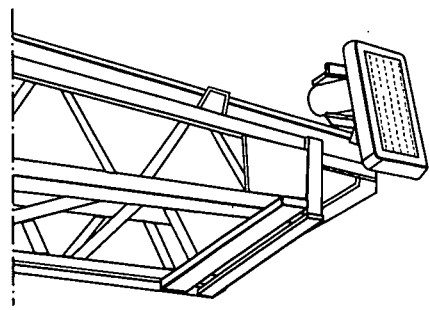
FIG. 14 shows the motor and gear reducer assembly of FIG. 13 mounted onto the top distal end of a conveyor.
Figure 15:
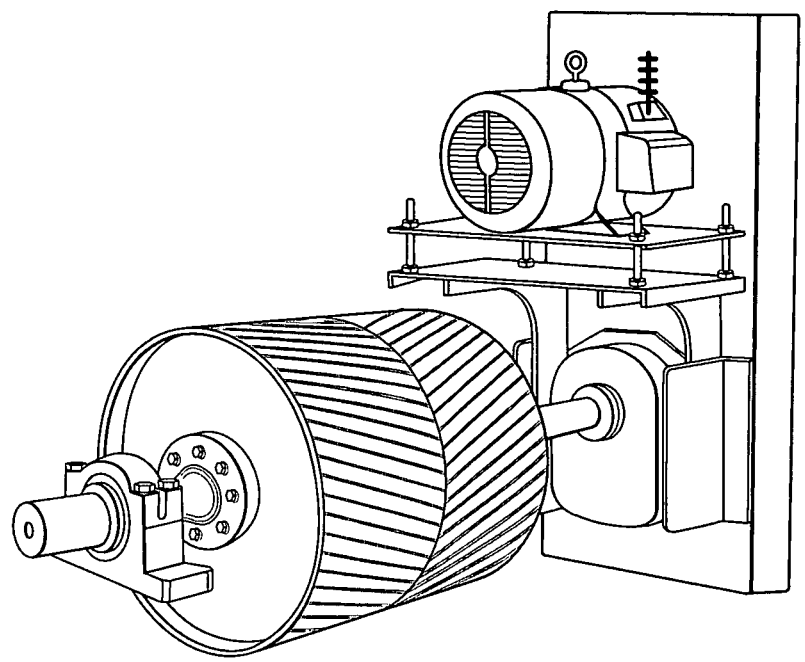
FIG. 15 shows the motor and gear reducer of FIG. 13 in cooperative engagement with a drive roller for a conveyor unit.
Figure 16:
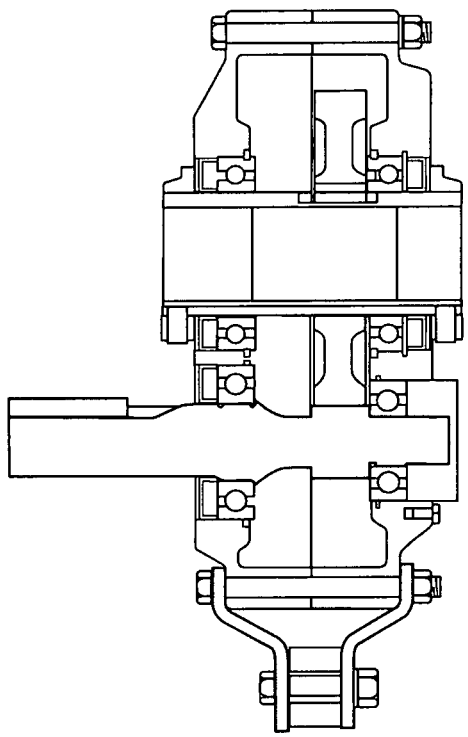
FIG. 16 is a top view of a gear reducer showing the oil reservoir therein.
Figure 17:
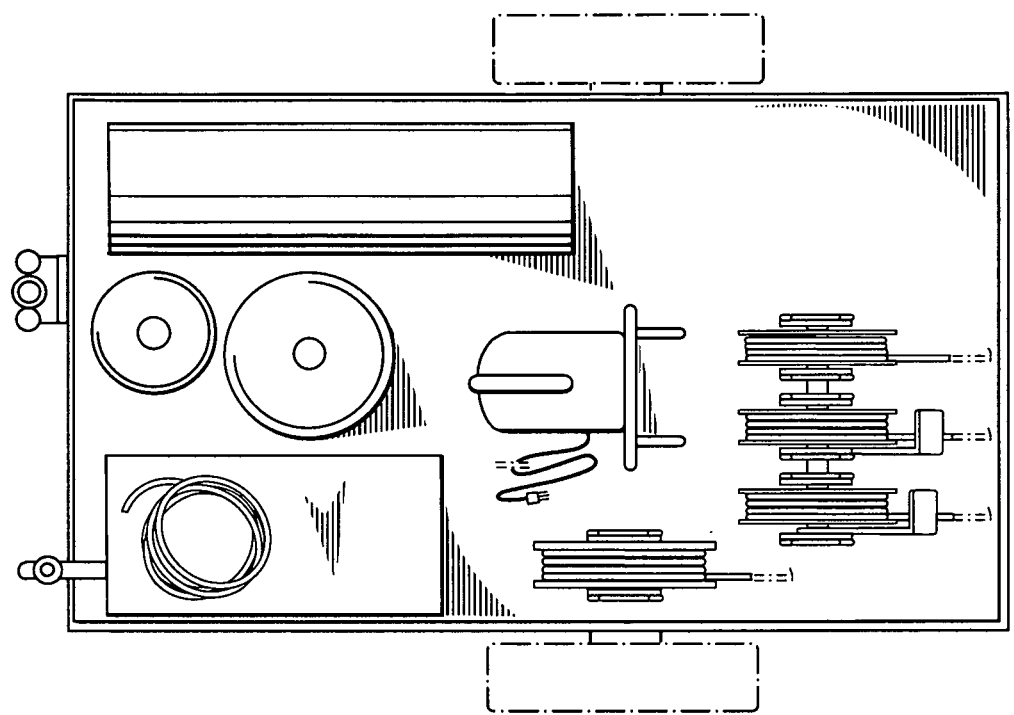
FIG. 17 shows the component location of the Gear Box Oil Change service trailer.
Figure 18:
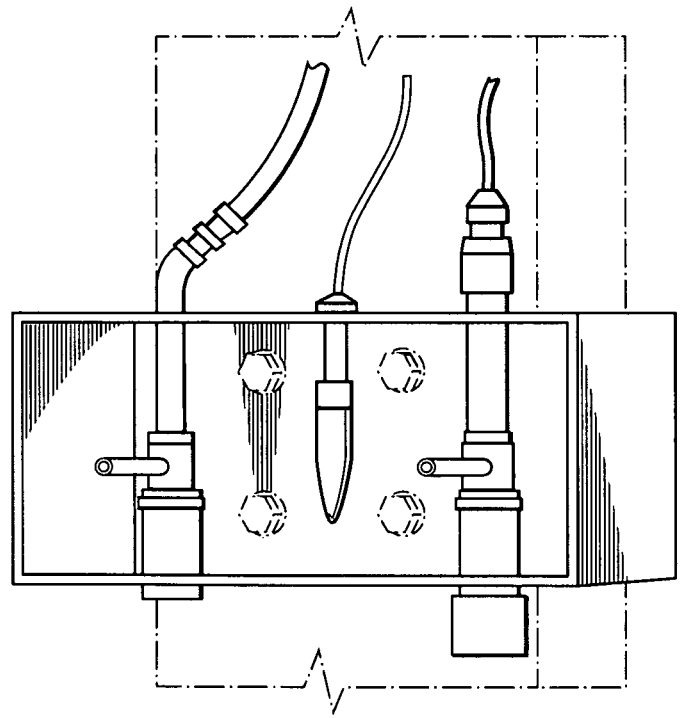
FIG. 18 shows the gear box oil change system and maintenance systems.

In accordance with the present invention, there is provided an overhead gearbox oil change system 10 which can be mounted onto a support surface or onto a vehicle such as a truck or trailer 12 including wheels 13 and a tongue 15. The system includes piping connecting the gearbox 2 to a manifold 14 having conveyor base hose connections located at a convenient location for the user and an oil change trailer 12 with hose reels for connecting a fresh oil container 18 and pump 70 and a waste oil container 20 and pump 74 to the manifold connections, along with a 110 VAC generator 22 to power the pumps and for other needs.

The gearbox 2 is driven by a motor 4 connected by a shaft 3. The gearbox is used to drive some device like a conveyor, crushing or grinding equipment, fans or the like. The gearbox 2 includes a drain hole 32, a fill hole 30 and an air vent hole 34. A pipe 31 connects the fill hole 30 to a male quick disconnect coupling 40 mounted on a manifold 14. The manifold 14 is located at a convenient height of about five feet above the ground level where a user may park an oil change trailer. Another pipe 33 connects the drain hole 32 to a male quick disconnect coupling 42 on the manifold. Finally, a pipe 35 connects vent hole 34 to a third male quick disconnect coupling 44 on the manifold.

An oil change trailer 12, includes a hose reel assembly 16 having three hose reels 66, 67, and 68, a fresh oil container 18 and pump 70, a waste oil container 20 and pump 74 and a 110 VAC generator 22 for powering the pumps and providing other power as needed. A hose 51 has a female quick disconnect coupling 41 at one end and the other end is connected to the hose reel 66. Another hose 61 connects hose reel 66 to a flow totalizer/meter 72, which is then connected to the output of a fresh oil pump 70. The fresh oil pump draws fresh oil from a fresh oil container 18.

A preferred pump and filter assembly sold under the trade name of DEISTER SYSTEM SAVER is available from Deister Systems and used for filtering out contaminants and harmful impurities in the lubricating oil to reduce expensive bearing replacement costs and system downtime and reuse lubricating oil. The pump and filter system can be used with the instant application to extend oil change-out intervals by filtering used oil without exposing the oil to the open environment and extending oil change intervals through filtration, and reducing oil disposal costs. The unit is capable of providing quick pressurized filling of viscous oils, saving time over gravity feeding. The pump is ¼ hp, 120 volts, 60 Hz and pumps one gallon/minute o synthetic or petroleum based oils using a primary coarse or water absorbing filter and a secondary polishing filter with a condition gauge to indicate the status of the filter element and a bypass valve to prevent damage in event a filter element becomes clogged with contaminants. Equivalent pumps and filters may be utilized with the present system as well.

Another hose 53 has a female quick disconnect coupling 43 at one end and the other end is connected to a hose reel 67. Hose reel 67 is then connected by line 63 to a two position-three way sampling valve 64. In one position, the valve sends waste oil into an oil sampling container. In the other position the valve sends the waste oil on to the waste oil filter 69. From the filter 69, the oil goes into the input of the waste oil pump 74 and on into the waste oil container 20.

Still another hose 55 has a female quick disconnect coupling 45 at one end and the other end is connected to a hose reel 68. Hose reel 68 is connected by pipe 65 to another a two position-three way valve 78 which selects either compressed air from compressor 76 or atmospheric air.

A typical gear box and oil change system includes a grease pump, gear oil tank, kerosene tank, hand truck and waste oil pump, grease pump, grease reel, gear oil reel, kerosene reel, waste oil reel, waste oil pump extension cord, waste oil tank, waste oil tank drain, air regulator, and manifold air line.

Operation:

To drain the gearbox reducer on a conveyor power transmission unit, the air lock is opened on the drain side to release the spent oil into the permanent plumbed lines extending from the gearbox to the ground. A line filter to protect the waste oil from damaging the drain pump and a valve to sample the waste oil prior to the filter to have it analyzed for metals or dirt that may be used as part of the system. Once the oil reaches ground or grade level the operator connects a hose via a reel extending from the waste oil container area and discharges the used oil into a container. Once oil is collected and contained the air lock is activated to a closed position. Pressurized air may be used to aid in removal of the waste oil. The gear box may be flushed with kerosene before refilling with 90 wt oil in winter or 220 wt oil in summer. Means of heating the kerosene, new oil or removed oil may be utilized to decrease the viscosity of the oil at low temperatures of less than 50 degrees in the winter months such as an electric blanket heater for drums or barrels.

To fill the gearbox reducer on a conveyor power transmission unit, the operator presets a meter to a desired set amount of new oil to be pumped from the ground or grade level to the gear box fill port with the plumbing line extending thereto. The preset amount of lubricating oil is calculated taking into consideration the length of the oil fill line as well as the distance of the height the gearbox reducer is located above the ground or selected grade. The fresh oil is pumped through the plumbed lines and dispensed into the gearbox to the preset full capacity. The lines are capped and sealed at the ground level and servicing is complete.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

We claim:

1. A lubrication change system for draining, flushing, and refilling an overhead gearbox mounted at the top of a conveyor consisting essentially of:

an overhead conveyor including a motor driven gearbox;

said motor driven gearbox including a plurality of piping connections to a manifold located at ground level location mounting to a conveyor base;

an oil change mobile platform having a plurality of hose reels with hoses, a fresh oil container with a fresh oil pump and a waste oil container with a waste oil pump connecting to said manifold, and a 110 VAC generator;

said motor driven gearbox having a drain hole formed therein, said motor driven gearbox having a oil fill hole formed therein, said motor driven gearbox having an air vent hole formed therein, a first pipe connecting said oil fill hole to a first male quick disconnect coupling mounted on said manifold, a second pipe connecting said drain hole to a second male quick disconnect coupling on said manifold, a third pipe connecting said air vent hole to a third male quick disconnect coupling on said manifold;

said motor driven gearbox including permanently plumbed piping from said drain hole, said oil fill hole, and said air vent hole to said manifold;

said plurality of hoses on said oil change mobile platform including a first hose reel, a second hose reel, and a third hose reel;

a first hose having a first female quick disconnect coupling at a first free end and a second free end connecting to said first hose reel, said first hose reel connecting to a flow totalizer/meter connecting to an output of said fresh oil pump, said fresh oil pump in fluid communication with a kerosene in a container for flushing a waste oil from said motor driven gearbox and said fresh oil pump in fluid communication with a fresh oil from said fresh oil container for filling said motor driven gearbox;

a second hose having a second female quick disconnect coupling at a first free end with a second free end connecting to said second hose reel connecting to a first two position-three way sampling valve, said first two position-three way sampling valve capable of sending said waste oil into an oil sampling container in a first selected position and sending said waste oil to a waste oil filter when in a second selected position, whereby said waste oil from said filter flows into an input of said waste oil pump and on into a waste oil container; and a third hose having a third female quick disconnect coupling at a first free end and a second free end connecting to said third hose reel, said third hose reel connecting to a second two position-three way valve capable of selecting compressed air from a compressor in a first selected position or atmospheric air in a second selected position.

2. The lubrication change system of claim 1, said gearbox including permanently plumbed piping from said drain hole, said oil fill hole, and said air vent hole to said manifold.

3. The lubrication change system of claim 1, including means of heating said kerosene, said fresh oil, and said waste oil to decrease the viscosity of the oil at low temperatures.

4. The lubrication change system of claim 3, wherein said means of heating said kerosene, said fresh oil, or said waste oil is an electric blanket heater.

5. The lubrication change system of claim 3, wherein said kerosene, said fresh oil, or said waste oil is heated to 55° F.

6. The lubrication change system of claim 1, including an air regulator in fluid connection with said compressed air.

7. The lubrication change system of claim 1, wherein said mobile platform is a trailer.

8. A lubrication change system for draining, flushing, and refilling an overhead gearbox mounted at the top of a conveyor consisting of:
an overhead conveyor including a motor driven gearbox;
said motor driven gearbox including a plurality of piping connections to a manifold located at ground level location mounting to a conveyor base;
an oil change mobile platform having a plurality of hose reels with hoses, a fresh oil container with a fresh oil pump and a waste oil container with a waste oil pump connecting to said manifold, and a 110 VAC generator;
said motor driven gearbox having a drain hole formed therein, said motor driven gearbox having a oil fill hole formed therein, said motor driven gearbox having an air vent hole formed therein, a first pipe connecting said oil fill hole to a first male quick disconnect coupling mounted on said manifold, a second pipe connecting said drain hole to a second male quick disconnect coupling on said manifold, a third pipe connecting said air vent hole to a third male quick disconnect coupling on said manifold;
said motor driven gearbox including permanently plumbed piping from said drain hole, said oil fill hole, and said air vent hole to said manifold;
said plurality of hoses on said oil change mobile platform including a first hose reel, a second hose reel, and a third hose reel;
a first hose having a first female quick disconnect coupling at a first free end and a second free end connecting to said first hose reel, said first hose reel connecting to a flow totalizer/meter connecting to an output of said fresh oil pump, said fresh oil pump in fluid communication with a kerosene in a container for flushing a waste oil from said motor driven gearbox and said fresh oil pump in fluid communication with a fresh oil from said fresh oil container for filling said motor driven gearbox;
a second hose having a second female quick disconnect coupling at a first free end with a second free end connecting to said second hose reel connecting to a first two position-three way sampling valve, said first two position-three way sampling valve capable of sending said waste oil into an oil sampling container in a first selected position and sending said waste oil to a waste oil filter when in a second selected position, whereby said waste oil from said filter flows into an input of said waste oil pump and on into a waste oil container; and
a third hose having a third female quick disconnect coupling at a first free end and a second free end connecting to said third hose reel, said third hose reel connecting to a second two position-three way valve capable of selecting compressed air from a compressor in a first selected position or atmospheric air in a second selected position.

9. A lubrication change system for draining, flushing, and refilling an overhead gearbox mounted at the top of a conveyor, comprising:
an overhead conveyor including a motor driven gearbox;
said motor driven gearbox including a plurality of piping connections to a manifold located at ground level location mounting to a conveyor base;
an oil change mobile platform having a plurality of hose reels with hoses, a fresh oil container with a fresh oil pump and a waste oil container with a waste oil pump connecting to said manifold, and a 110 VAC generator;
said motor driven gearbox having a drain hole formed therein, said motor driven gearbox having a oil fill hole formed therein, said motor driven gearbox having an air vent hole formed therein, a first pipe connecting said oil fill hole to a first male quick disconnect coupling mounted on said manifold, a second pipe connecting said drain hole to a second male quick disconnect coupling on said manifold, a third pipe connecting said air vent hole to a third male quick disconnect coupling on said manifold;
said motor driven gearbox including permanently plumbed piping from said drain hole, said oil fill hole, and said air vent hole to said manifold;
said plurality of hoses on said oil change mobile platform including a first hose reel, a second hose reel, and a third hose reel;
a first hose having a first female quick disconnect coupling at a first free end and a second free end connecting to said first hose reel, said first hose reel connecting to a flow totalizer/meter connecting to an output of said fresh oil pump, said fresh oil pump in fluid communication with a kerosene in a container for flushing a waste oil from said motor driven gearbox and said fresh oil pump in fluid communication with a fresh oil from said fresh oil container for filling said motor driven gearbox;
a second hose having a second female quick disconnect coupling at a first free end with a second free end connecting to said second hose reel connecting to a first two position-three way sampling valve, said first two position-three way sampling valve capable of sending said waste oil into an oil sampling container in a first selected position and sending said waste oil to a waste oil filter when in a second selected position, whereby said waste oil from said filter flows into an input of said waste oil pump and on into a waste oil container; and
a third hose having a third female quick disconnect coupling at a first free end and a second free end connecting to said third hose reel, said third hose reel connecting to a second two position-three way valve capable of selecting compressed air from a compressor in a first selected position or atmospheric air in a second selected position.

10. The lubrication change system of claim 9, said gearbox including permanently plumbed piping from said drain hole, said oil fill hole, and said air vent hole to said manifold.

11. The lubrication change system of claim 9, including means of heating said kerosene, said fresh oil, and said waste oil to decrease the viscosity of the oil at low temperatures.

12. The lubrication change system of claim 11, wherein said means of heating said kerosene, said fresh oil, or said waste oil is an electric blanket heater.

13. The lubrication change system of claim 11, wherein said kerosene, said fresh oil, or said waste oil is heated to 55° F.

14. The lubrication change system of claim 9, including an air regulator in fluid connection with said compressed air.

15. The lubrication change system of claim 9, wherein said mobile platform is a trailer.

* * * * *